United States Patent [19]

Fuzisawa et al.

[11] 4,083,145
[45] Apr. 11, 1978

[54] **METHOD FOR VESSEL CULTIVATION OF *LENTINUS EDODES***

[75] Inventors: Noriyoshi Fuzisawa, Sakura; Akio Maedai, Funabashi; Kenichi Hattori, Musashino, all of Japan

[73] Assignee: Kao Soap Co., Ltd., Tokyo, Japan

[21] Appl. No.: 808,977

[22] Filed: Jun. 22, 1977

[30] Foreign Application Priority Data

Jul. 13, 1976 Japan .................................. 51-83133

[51] Int. Cl.² ............................................. A01G 1/04
[52] U.S. Cl. ....................................................... 47/1.1
[58] Field of Search ............................................. 47/1.1

[56] References Cited

FOREIGN PATENT DOCUMENTS 4,527,769 9/1970 Japan ..................................... 47/1.1
4,527,771 9/1970 Japan ..................................... 47/1.1

*Primary Examiner*—Robert E. Bagwill
*Attorney, Agent, or Firm*—Blanchard, Flynn, Thiel, Boutell & Tanis

[57] ABSTRACT

*Lentinus edodes* is cultivated in wide-mouth bottles or bags by forming a plurality of holes in the culture medium along the inner wall of the bottle or bag and inoculating the fungus seed into those holes.

6 Claims, 4 Drawing Figures

METHOD FOR VESSEL CULTIVATION OF LENTINUS EDODES

BACKGROUND OF THE INVENTION

1. Field of the Invention

The present invention relates to an inoculating and cultivating method for the so-called "vessel" cultivation of *Lentinus edodes*, using a vessel such as a bottle or a bag, in which after 50 to 60 days' cultivation of hyphae, the culture medium is drawn out from the vessel, whereby it is possible to cause fruit bodies to grow from the entire surface (except the bottom face) of the culture medium.

Vessel cultivation, especially in bottles, has heretofore been widely practiced on an industrial scale for the cultivation of *Flammulina velutipes, Pleurotus ostreatus, Pholiota nameko* and the like. According to such vessel cultivation method, in general, as shown in FIGS. 1 and 2, 400 to 800 g of a culture medium 1 comprising a mixture of sawdust, rice bran, water and the like is placed in a heat-resistant synthetic resin bottle having a capacity of 500 to 100 ml, and one seed-inoculating and air-permeating hole 2 is formed at the center of the culture medium so that the hole extends substantially to the bottom of the bottle. An air filter such as a paper plug or a cotton plug is placed on the bottle mouth so as to prevent intrusion of miscellaneous unwanted fungi and bacteria. Then, the bottle is heated and sterilized, and after cooling, the desired fungus seed is inoculated on the entire top face of the culture medium and in the hole formed at the center thereof. Then, hyphae are sufficiently propagated in the culture medium at appropriate temperatures, the air filter on the bottle mouth is removed and fruit bodies are caused to grow from the bottle mouth under appropriate temperature and humidity conditions. The time required for accomplishing all of the foregoing steps is 50 to 60 days and the amount of harvested fruit bodies is generally 60 to 120 g per bottle. This method is excellent in the feature that (1) the culture medium is scarcely or not at all contaminated by miscellaneous unwanted fungi and bacteria and (2) because many of the steps can be performed mechanically, the cultivation process as a whole can easily be standardized. The bottles that are customarily used for this cultivation method include a blown bottle having a relatively small mouth diameter of about 5 to about 6 cm as shown in FIG. 1 and a wide-mouthed bottle or pot, like a flower pot, having a mouth diameter of about 10 to about 13 cm as shown in FIG. 2. The blown bottle is used for cultivation of *Flammulina veutipes* and Pleurotus ostreatus and the wide-mouthed bottle or pot is used for cultivation of *Pholiota nameko* and and *Pleurotus ostreatus*.

According to our previously proposed cultivation method disclosed in Japanese patent application No. 59815/76, filed May 24, 1976 (corresponding to U.S. Ser. No. 794,100, filed May 5, 1977), the entire contents of which are incorporated herein by reference, in which a coating material, which is air permeable and is not decomposed by hyphae of *Lentinus edodes*, is locally applied to the mushroom-growing surface of the culture medium, it became possible for the first time to cause fruit bodies of *Lentinus edodes* to grow from bottle mouths in from 50 to 60 days' cultivation time according to the foregoing procedures of the conventional bottle cultivation. The present invention provides an improved method for the vessel cultivation of *Lentinus edodes* in which the cultivation can be performed more efficiently. In the case of *Flammulina veutipes* and *Pleurotus ostreatus,* fruit bodies form a colony by branching, but in the case of *Lentinus edodes,* the respective fruit bodies tend to grow independently and generation of large quantities of fruit bodies from a small mushroom-growing surface area cannot be expected. Further, because fruit bodies of *Lentinus edodes* have a large cap, in order to prevent deformation caused by abutting of caps against one another and subsequent reduction of the commercial value of the mushroom produce, it is necessary to provide a relatively large mushroom-growing area and a sufficient space between adjacent fruit bodies.

For the foregoing reasons, there has been adopted a method for bottle cultivation of *Lentinus edodes* in which a wide-mouthed bottle or pot is used and the operations are carried out according to the above-described conventional bottle cultivation procedure and, after hyphae have sufficiently grown in the culture medium, the culture medium is taken out from the bottle, in the form of a unitary or one-piece structure, so that fruit bodies will grow from the entire surface of the culture medium inclusive of the side faces, but excluding the bottom face of the culture medium. However, according to this method, even though after a relatively short-period cultivation conducted for 50 to 60 days, hyphae grow sufficiently in the entire culture medium, fruit bodies are scarcely grown from the side faces of the culture medium, and the intended object of this invention cannot be attained.

In order to clarify the cause of this undesirable phenomenon, we made various investigations and experiments, and as a result, it was found that the above undesirable phenomenon probably is due to the following important inherent biological properties of *Lentinus edodes:*

1. In order for hyphae on the surface of the culture medium to form fruit bodies, they must reach a certain hypha age, and as the distance between the surface portion of the hypya and the inoculation position becomes greater, a longer time is required for the hypha to reach the above certain age. In other words, hyphae located at positions closer to the inoculation position reach a fruit body-forming age more rapidly.
2. Fruit bodies can grow only from that area of the surface of the culture medium which has been sufficiently permeated by air from the start of the cultivation of hyphae (from a time before the initiation of the fruit body-growing treatment).

SUMMARY OF THE INVENTION

Based on the foregoing findings, we discovered that when the so-called vessel cultivation of *Lentinus edodes* using a bottle (wide-mouthed bottle) or a bag is carried out, if inoculation of the fungus seed and air permeation are conducted in advance also on the side face portions of the culture medium, as well as on the upper surface of the culture medium bed and in the central hole, the time required for hyphae to grow entirely on the culture medium is shortened and when the culture medium is taken out, as a unit, from the vessel and is subjected to the fruit body-growing treatment such as a low temperature treatment, large quantities of fruit bodies of *Lentinus edodes* are formed with assurance even from the side faces of the culture medium and even if the cultivation time is as short as 50 to 60 days. Based on this discovery, we have now completed the present invention.

The present invention will now be described in detail by reference to an embodiment using a wide-mouthed bottle.

The characteristic features of the present invention, namely, seed inoculation and air permeation of the side face portions of the culture medium, are first described.

Figure 1:
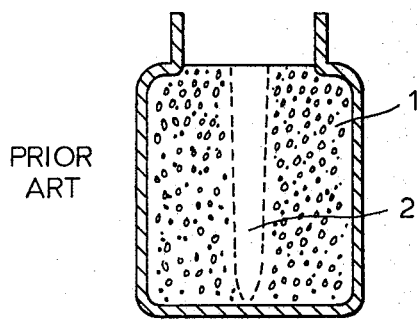
FIG. 1 is a central sectional view of a blown bottle of small mouth diameter and containing a culture medium having a hole formed at the center thereof.
Figure 2:
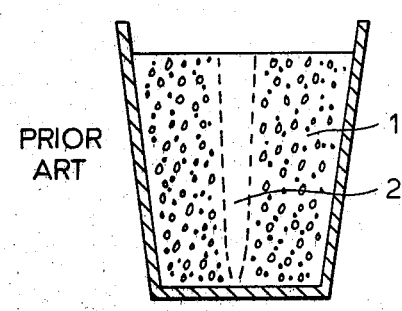
FIG. 2 is a corresponding view of a wide mouth bottle or pot.
Figure 3:
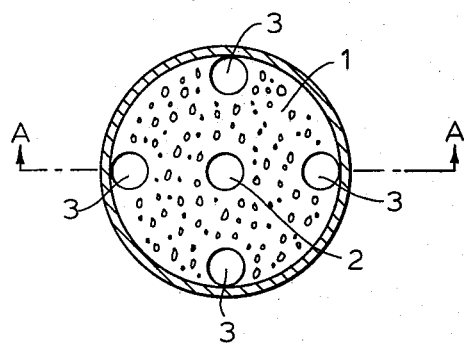
FIG. 3 is a top view of a wide mouth bottle and showing holes formed at the center and at the side faces of the culture medium.
Figure 4:
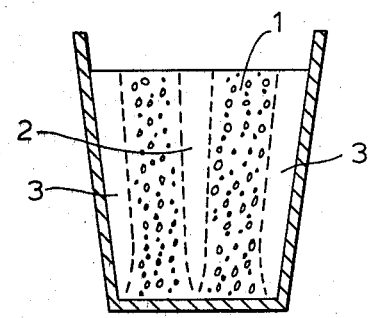
FIG. 4 is a sectional view taken along line A—A of FIG. 3.

According to the conventional methods (FIGS. 1 and 2), one seed-inoculating and air-permeating hole 2 is formed only at the center of the top face of the culture medium so that it extends substantially to the bottle wall. In contrast, according to the method of the present invention, as shown in FIGS. 3 and 4, a suitable number of additional holes 3 which extend in the vertical direction along the inner wall of the bottle, are formed in the side face portions of the culture medium, and they also extend substantially to the bottom of the bottle. The cross-sectional shape of such holes is not particularly critical. The holes can have a circular, semi-circular, triangular or square form or any other optional form. In the case of circular holes, it is preferred that the diameter be in the range of from 5 to 20 mm. It is not critical that the holes 2 and 3 extend to the bottom of the bottle, but as the depth of the holes is decreased, the area available for growth is also decreased and the yield of fruit bodies likewise decreases. Thus, it is preferred that the depth of the holes be from about 50 to 100% of the depth of the culture medium bed and that the holes be as deep as possible provided that the structural integrity of the culture medium bed is not reduced excessively. A plurality of holes are formed, and in general, effective results are obtained if three to six holes 3 are formed in the case of a wide-mouthed bottle having a diameter of 10 to 13 cm. In the embodiment shown in FIGS. 3 and 4, four seed-inoculating and air permeating holes 3 are formed along the inner wall of the bottle. It is conventional in the art to form one hole 2 at the center, but there has not been known a method in which a plurality of additional holes 3 are formed along the inner wall of the bottle as in the present invention. Further, it has not been known that if additional holes 3 are formed in such a manner, after withdrawing the culture medium from the bottle, large quantities of fruit bodies of *Lentinus edodes* will also be formed from the side faces of the culture medium in a short time with assurance. These are novel characteristic features of the present invention.

The other conditions, such as the culture medium material, the sterilization method and the cultivation temperature are substantially the same as the above-mentioned conditions customarily employed in the art. When hyphae have grown sufficiently in the culture medium, the culture medium is taken out from the bottle, as a unit, and then it is subjected to the conventional fruit body-growing treatment such as the low temperature treatment, typically at a temperature of from 15° to 20° C for about 6 to 9 days to form fruit bodies. As a result, large quantities of fruit bodies of *Lentinus edodes* are formed from the side faces of the culture medium with assurance. Further, since the mushroom-growing area is quite large, abutting of the caps of fruit bodies against one another is minimized or eliminated and fruit bodies having a normal shape are obtained. Also in the case of the bag cultivation using a heat-resistant synthetic resin film bag, fruit bodies of *Lentinus edodes* can be formed with assurance from the side faces of the culture medium by the same procedures as described above.

Any materials suitable for the growth of hyphae of *Lentinus edodes*, such as sawdust, bagasse, rice hulls, rice bran and wheat bran, can be used as the culture medium. They can be used singly, or two or more of them can be used in admixture. The optimum water content of the culture medium is 65 to 75 wt. %.

As will be apparent from the foregoing description, according to the method of the present invention, by the simple operations of forming seed-inoculating and air-permeating holes 3 along the inner wall of the vessel and inoculating the fungus seed into these holes, it becomes possible to complete the vessel cultivation of *Lentinus edodes* within only 50 to 60 days, even though such short time cultivation is, in practice, difficult or impossible using the conventional methods. Thus, the present invention provides an excellent method for cultivating *Lentinus edodes* by simple procedures such as those adopted for the cultivation of *Flammulina veutipes* and the like and hence, the present invention is an important contribution to the industry for producing *Lentinus edodes*.

The present invention will now be further described by reference to the following illustrative Example.

EXAMPLE

A composition comprising 6.9 parts by weight of sawdust, 3.9 parts of rice hulls, 2.2 parts by weight of defatted rice bran and 18.3 parts of water was homogeneously mixed to form a culture medium, and 600 g of the thus prepared culture medium was placed in a wide-mouthed polypropylene bottle having a capacity of 1000 ml and a mouth diameter of 11 cm. As shown in FIG. 3, one hole 2 was formed at the center of the culture medium and four seed-inoculating and air-permeating holes 3 were formed substantially equidistantly along the inner wall of the bottle, each hole having a diameter of 12 mm. The top face of the culture medium was partially covered with a polypropylene film having a thickness of 50 $\mu$. A lid having an air-filtering property was attached to the bottle mouth in order to prevent intrusion of miscellaneous unwanted fungi and bacteria, and the bottle was subjected to pressurized steam sterilization at a temperature of 121° C under a pressure of 1.2 Kg/cm$^2$ for 90 minutes. After cooling, the fungus seed of *Lentinus edodes* was inoculated in each of the above five holes and on the top face of the culture medium.

Cultivation was carried out at 25° C, and in 20 to 23 days hyphae grew entirely on the culture medium. The cultivation was further continued and on the 51st day from the date of inoculation of the fungus seed, the culture medium was taken out, as a unit, from the bottle and was subjected to the fruit body-growing treatment at a temperature of 15° C and a relative humidity of 85%. After 3 days, the formation of fruit bodies from the top face and side faces of the culture medium was observed, and after 5 days, completely grown fruit bodies were obtained. The quantity of the thus-formed fruit bodies of *Lentinus edodes* is shown in Table 1. In Table 1, the comparative run identifies a run wherein the cultivation was carried out in the same manner as described above except that seed-inoculating and air-permeating holes 3 were not formed along the inner wall of the bottle; namely, only one hole 2 was formed at the center of the culture medium, and the fungus seed was inoculated in this single hole and on the top face of the culture medium. In this comparative run, 28 to 31 days were necessary for hyphae to grow entirely on the culture medium, and by the low temperature treatment conducted after 51 days' cultivation, fruit bodies were formed only from the top face of the culture medium and no fruit bodies were formed from the side face portions of the culture medium.

With respect to each of (1) the run of the present invention and (2) the comparative run, the experiment was performed using five bottles. In the case of the run of the present invention, 10.6 fruit bodies on the average were formed from the top face and side faces of one culture medium and the average amount of fruit bodies formed on one culture medium was 132 g. In contrast, in the comparative run, fruit bodies grew only from the top face, and the average number and weight of fruit bodies growing on one culture medium were 3 fruit bodies and 52 g, respectively.

Table 1

| | | Seed Inoculating Methods and Amounts of Fruit Bodies Formed | | |
|---|---|---|---|---|
| | | | Total Amount of Fruit Bodies Formed | |
| Run | Culture No. | Fruit Body-Growing Position | Number | Total Weight (g) |
| Run of Present | 1 | top face and side faces of culture medium | 12 | 142 |
| Invention | 2 | " | 8 | 125 |
| | 3 | " | 11 | 132 |
| | 4 | " | 13 | 140 |
| | 5 | " | 9 | 121 |
| Comparative Run | 1 | only top face of culture medium | 3 | 51 |
| | 2 | " | 3 | 46 |
| | 3 | " | 4 | 69 |
| | 4 | " | 3 | 56 |
| | 5 | " | 2 | 38 |

The embodiments of the invention in which an exclusive property or privilege is claimed are defined as follows:

1. A method for the vessel cultivation of *Lentinus edodes* in a bed of culture medium contained in an open-topped vessel which comprises forming a plurality of open-topped seed-inoculating and air-supplying holes in the side face of the bed of culture medium and extending along the inner wall of the vessel, sterilzing said bed, then inoculating fungus seed of *Lentinus edodes* in the holes of the sterilized bed of said culture medium, cultivating said bed to generate hyphae of *Lentinus edodes* in the culture medium, then taking the bed, as a unit, out of the vessel, then subjecting the bed to mushroom-growing conditions effective to form fruit bodies of *Lentinus edodes* which grow from the side faces of the culture medium.

2. A method for the vessel cultivation of *Lentinus edodes* according to claim 1 wherein the fungus seed is inoculated also on the top face of the bed of culture medium.

3. A method for the vessel cultivation of *Lentinus edodes* according to claim 1 wherein one seed-inoculating and air-supplying hole is also formed at the center of the culture medium.

4. A method for the vessel cultivation of *Lentinus edodes* according to claim 1 wherein the seed-inoculating and air-supplying holes have a diameter of 5 to 20 mm.

5. A method for the vessel cultivation of *Lentinus edodes* according to claim 1 wherein the culture medium is a solid culture medium containing a member selected from the group consisting of sawdust, bagasse, rice hulls, rice bran, wheat bran and mixtures thereof.

6. A method according to claim 1 in which the bed is cultivated at about 25° C for a total of about 50 to 60 days and then said bed is subjected to mushroom-growing conditions at a temperature of about 15° to 20°0 C for about 6 to 9 days to form the fruit bodies.

* * * * *